United States Patent [19]
Li et al.

[11] Patent Number: 5,644,790
[45] Date of Patent: Jul. 1, 1997

[54] UNIVERSAL CD ROM INTERFACE USING SINGLE INTERFACE CONNECTION

[75] Inventors: Raymond M.L. Li, Scarborough; Henry Quan, Woodbridge, both of Canada

[73] Assignee: ATI Technologies, Inc., Thornhill, Canada

[21] Appl. No.: 197,335

[22] Filed: Feb. 16, 1994

[51] Int. Cl.[6] ................................................ G06F 13/14
[52] U.S. Cl. .......................... 395/883; 395/884; 395/285; 395/500
[58] Field of Search ...................... 395/275, 325, 395/500, 200, 830, 831, 832, 856, 858, 871, 882, 883, 285, 884

[56] References Cited

U.S. PATENT DOCUMENTS

| | | | |
|---|---|---|---|
| 4,180,860 | 12/1979 | Driscott et al. | 364/139 |
| 4,342,081 | 7/1982 | Dubuc | 395/883 |
| 4,535,403 | 8/1985 | Holland | 395/856 |
| 4,641,261 | 2/1987 | Dwyer et al. | 395/883 |
| 4,725,249 | 2/1988 | Blackwood et al. | 439/535 |
| 4,803,623 | 2/1989 | Klashka et al. | 395/828 |
| 4,807,282 | 2/1989 | Kazan et al. | 379/284 |
| 4,825,402 | 4/1989 | Jalali | 395/500 |
| 4,868,783 | 9/1989 | Anderson et al. | 395/281 |
| 4,954,949 | 9/1990 | Rubin | 395/200.01 |
| 4,965,771 | 10/1990 | Morikawa et al. | 395/12 |
| 5,005,151 | 4/1991 | Kurkowski | 395/856 |
| 5,038,299 | 8/1991 | Maeda | 395/836 |
| 5,090,830 | 2/1992 | Kroeger et al. | 400/719 |
| 5,159,545 | 10/1992 | Lee | 363/146 |
| 5,276,443 | 1/1994 | Gates et al. | 395/822 |
| 5,335,338 | 8/1994 | Proesel | 395/500 |

*Primary Examiner*—Krisna Lim
*Assistant Examiner*—Viet Vu
*Attorney, Agent, or Firm*—Pascal & Associates

[57] ABSTRACT

The present invention relates to a universal peripheral interface comprised of control logic circuits for a plurality of peripherals carrying different signals on different pins of respective peripheral connectors, a single interface connector for mating with any of the peripheral connectors, a first multiplexer for interfacing any of the control logic circuits with the single interface connector and for switching particular lines of each of the control logic circuits carrying particular signals to particular pins of the single connector, and apparatus for controlling the multiplexer to map the lines to the particular pins of the single connector.

9 Claims, 6 Drawing Sheets

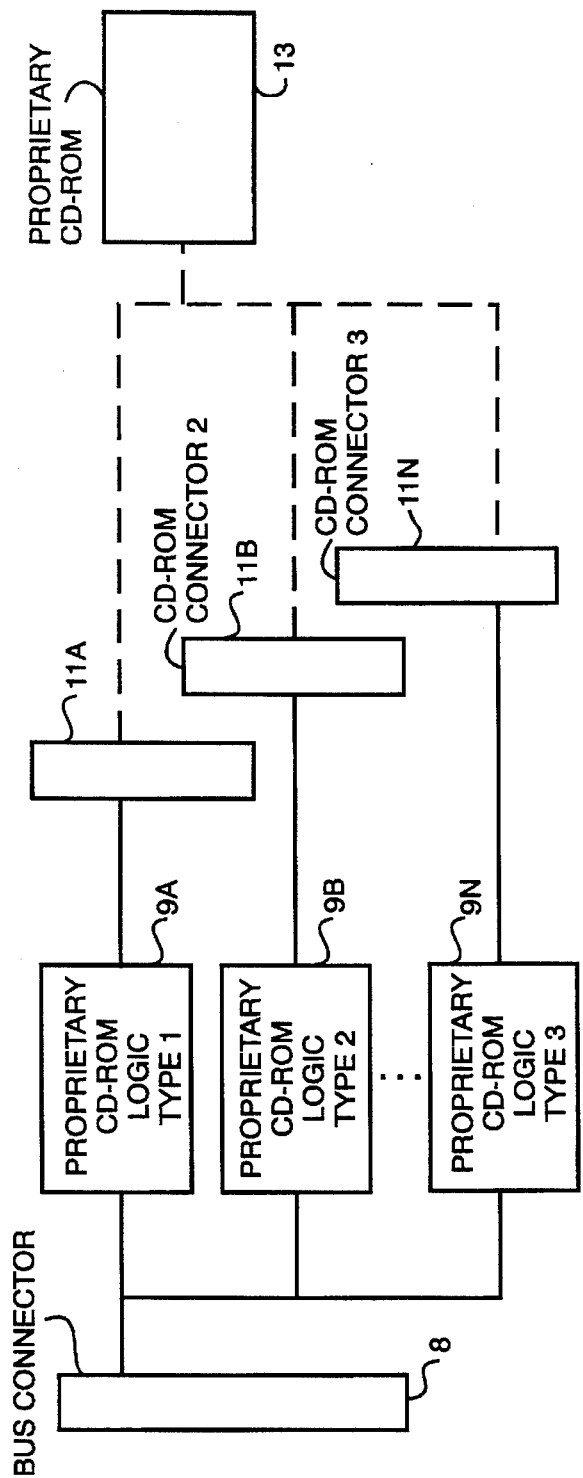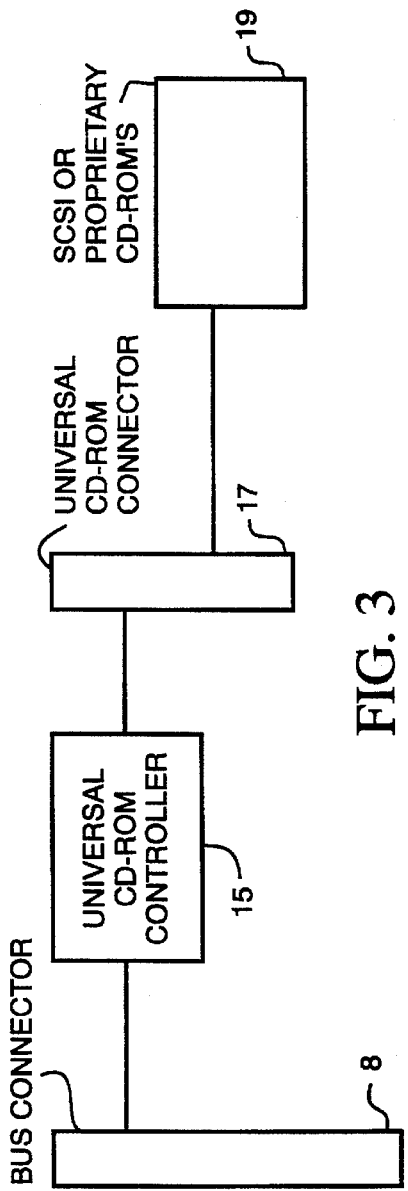

UNIVERSAL CD ROM INTERFACE USING SINGLE INTERFACE CONNECTION

FIELD OF THE INVENTION

This invention relates to computers and in particular to a universal interface to computers for peripherals such as CD ROMS (compact disk read only memories).

BACKGROUND TO THE INVENTION

A popular interface for computers is the SCSI standard interface. Peripherals such as hard disk drives and CD ROMS made by some manufacturers meet the SCSI standard, but some do not. The SCSI standard dictates the use of an SCSI interface circuit board plugged into a slot of the computer, and a standard socket that is externally available into which a plug wired to a peripheral (device) may be connected. Pins of the SCSI socket connect to predefined and standard signal lines.

However, some manufacturers make peripherals that are proprietary, and do not meet the SCSI standard. If the computer owner wishes to use different peripherals at different times, or wishes to change peripherals, a different interface circuit board must be purchased with a circuit and socket that matches that of the different peripheral, and plugged into the computer, with the attendant requirement to remove the cover of the computer and risk damage to the computer, or at least disruption to the physical environment of the user as well as to work that must be done using the computer. For proprietary CD ROMs, for example, a unique interface circuit and a different connector is required for each type of CD ROM. This precludes a design that supports multiple types of CD ROMs without many circuit boards and connectors and which use up valuable empty slots of the computer motherboard.

SUMMARY OF THE INVENTION

The present invention is a universal interface which allows any one of plural peripherals to be plugged into one or two sockets carried by the interface. Once it has been installed, the only requirement to accommodate a changed or new peripheral is to select it from a menu using a software program; no further physical interference with the computer is required. One connector socket may be used to accommodate both proprietary and SCSI connector plugs, or one socket may be used for the proprietary plugs, and another may be used for an SCSI plug.

In accordance with an embodiment of the invention, a universal peripheral interface is comprised of control logic circuits for a plurality of peripherals carrying different signals on different pins of respective peripheral connectors, a single interface connector for mating with any of the peripheral connectors, a first multiplexer for interfacing any of the control logic circuits with the single interface connector and for switching particular lines of each of said control logic circuits carrying particular signals to particular pins of said single connector, and means for controlling the multiplexer to map said lines to said particular pins of said single connector.

BRIEF INTRODUCTION TO THE DRAWINGS

A better understanding of the invention will be obtained by reading the description of the invention below, with reference to the following drawings, in which:

FIG. 1 is a basic block diagram illustrating an SCSI design in accordance with the prior art, FIG. 2 is a basic block diagram illustrating a design of plural CD ROM interfaces in accordance with the prior art, FIG. 3 is a basic block diagram of the present invention, FIG. 4 is a more detailed block diagram of the present invention, FIG. 5 is an even more detailed block diagram of the present invention, FIG. 6 is a schematic diagram of a multiplexer that can be used as part of the invention, and FIG. 7 is a block diagram of plural proprietary CD ROM and an SCSI plugs and universal connector into which they may be connected.

DETAILED DESCRIPTION OF THE INVENTION

Figure 1:
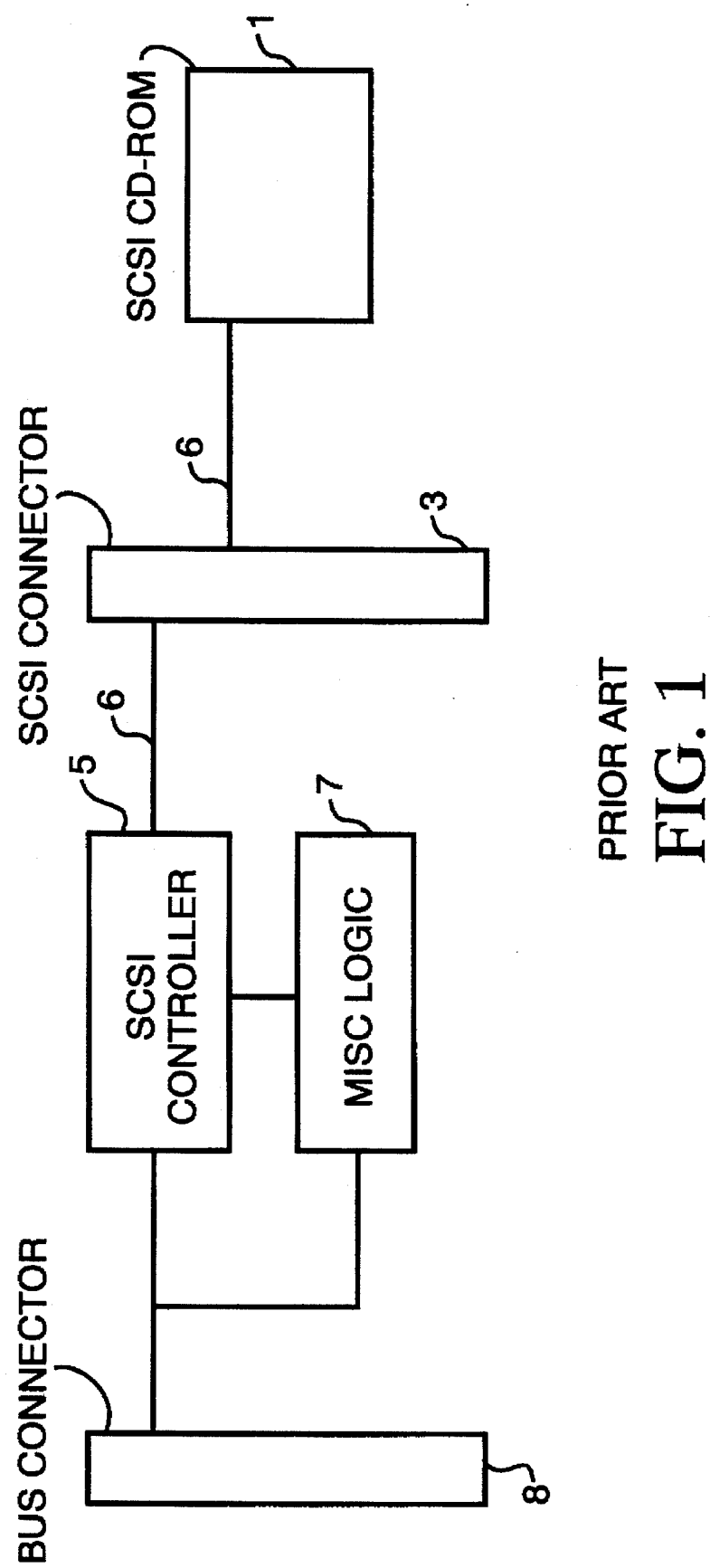

FIG. 1 illustrates a block diagram of a typical SCSI CD-ROM interface. An SCSI CD-ROM 1 is connected via a standard 50 pin SCSI connector assembly 3 (male and female) to an SCSI controller 5 via an SCSI bus 6. The controller is controlled in a well known manner by miscellaneous logic circuit 7. Both controller and logic circuit are connected to a host bus, usually via a bus connector 8.

While the aforenoted system can allow connection of an SCSI CD-ROM to the host computer system, it cannot accommodate proprietary CD-ROMs, since proprietary CD-ROMs have different signal requirements which are transmitted and received on different leads than are usual on the SCSI bus. In addition, each proprietary CD-ROM is driven by a different form of CD-ROM logic circuit. In order to use a proprietary CD-ROM, a dedicated proprietary CD-ROM control logic circuit is plugged into a computer, which carries a CD-ROM connector into which a cable of the proprietary CD-ROM is plugged. While the connector is typically 40 pin, each different proprietary CD-ROM transmits and receives signals through different pins from others.

It is desirable for computer manufacturers to provide computers into which any CD-ROM, proprietary or standard SCSI versions, can be connected. To accommodate this structure, computers contain "slots", that is, empty connectors connected to the main bus of the computer, into which various control or other interface circuits can be plugged. Thus, for example, to accommodate four different CD-ROM interface circuits and a standard SCSI interface, five different interface boards, each carrying its own interface connector are plugged into different slots of the computer.

This structure is shown in FIG. 2. Proprietary interface circuit boards 9A–9N, each carrying its own connector, respectively 11A–11N, are plugged into the main bus of the host computer. Whatever proprietary type of CD-ROM 13 the owner of the computer wishes may be plugged into the corresponding connector 11A–11N. In this case either all or a large fraction of the slots typically available on a desktop computer are used up with the aforenoted mostly redundant and power wasting circuitry.

The alternative is to use only a single proprietary interface circuit 5 connected in the host computer as in the system of FIG. 1, restricting the owner to only the CD-ROM that is matched to the interface.

FIG. 3 is a block diagram of the present invention. An universal interface 15 which is connected to a universal connector 17 is used. The universal interface 15 is connected to the host computer bus via the usual connector 8, although it may be physically connected to the host computer carried on-board the main computer circuit board, and accessed via the main bus, a peripheral bus, or by other means that will be understood by persons skilled in the art.

Any proprietary peripheral 19 that can be accommodated by the universal interface 15 may be connected to the universal connector 15, including an SCSI peripheral, depending on the connector 17 that is used, as will be understood after understanding the description below, which will be explained using CD-ROM peripherals and interfaces as an example of the preferred embodiment.

Figure 4:
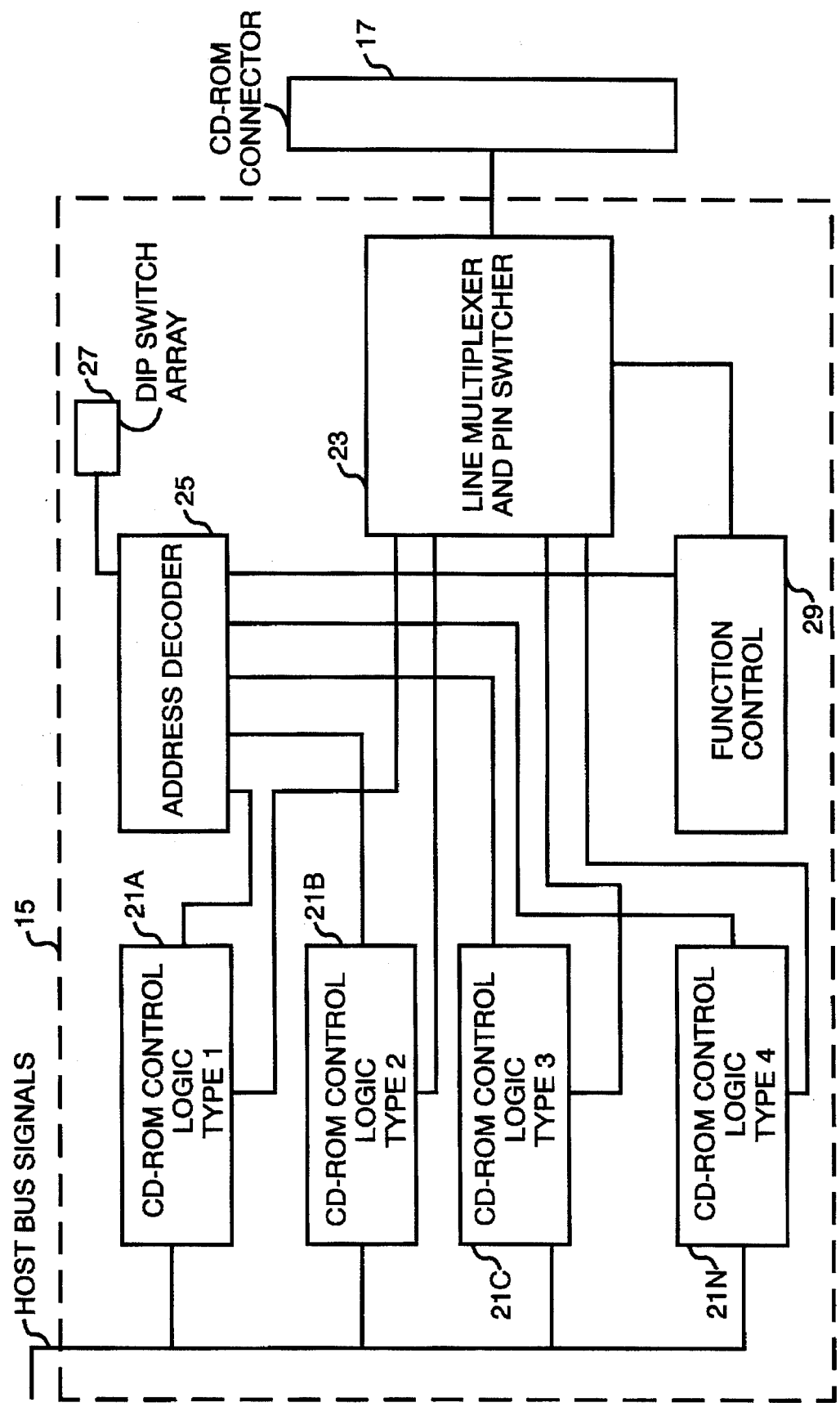

FIG. 4 is a more detailed block diagram of the system shown in FIG. 3. The universal interface 15 is comprised of specialized CD-ROM control logic circuits 21A–21N. Each control logic circuit 21A–21N corresponds to elements 5 and 7 of FIG. 1, and one can be an SCSI control interface circuit, and are preferably mounted on a single printed circuit board for connection to the host bus, or are connected to the host in another way, and can be mounted on the host motherboard.

Each logic circuit 21A–21N is connected to the input of a line multiplexer and pin switcher 23. A DIP switch array 27 is connected to an address decoder 25. The address decoder is connected to each of the logic circuits 21A–21N. A function control 29 is connected to the address decoder 25, and to a control input of the line multiplexer and pin switcher 23.

The single universal CD-ROM connector 17 is connected to the output of the line multiplexer and pin switcher 23.

In operation, the user selects which CD-ROM he or she wishes to use. From a chart supplied by the universal interface manufacturer, the user is told which of the DIP switches in array 27 are to be closed to designate that selected CD-ROM.

With the appropriate DIP switches 27 closed, an address is presented to address decoder 25. The decoder provides an enable signal to the addressed one of the control logic circuits 21A–21N, and as well, signifies the address to function control 29. Function control 29 in turn provides a selection signal to multiplexer and switcher 23, in order to cause the correct input lines corresponding to the addressed control logic circuit 21A–21N to be connected to predetermined pins of the universal connector 17.

The selected CD-ROM that is connected to the universal connector 17 is thus enabled to communicate with the host computer and be controlled by the appropriate control logic 21A–21N.

It should be noted that rather than requiring the use of DIP switch array 27, it could be dispensed with if the address decoder is connected to the host computer address conductors of the main bus, or be otherwise controlled by the host computer. In this case, software programs can cause supply of an appropriate address to address decoder 25 instead of DIP switch 27. For example, a software program can list a selection of CD-ROMs, and the user can configure the universal interface by selection of one from a menu list, resulting in the software program causing downloading of a corresponding address to address decoder 25.

The universal connector 17 may be of a type that will accommodate both matching SCSI peripheral device connectors and proprietary peripheral device connectors. An SCSI connector is standardized with 50 pins, and CD-ROM proprietary connectors have typically 40 pins. The universal connector may be physically designed with 50 pins, to accommodate both types of peripheral.

In addition, as will be described below, typically CD-ROM connectors are comprised of two parallel rows of pins, with signal carrying conductors connected to only one of the rows, the other row being connected to ground. It is preferred that the universal connector should have only one row of pins switched in multiplexer and switcher 23, whereby a proprietary peripheral connector which has its row of signal carrying pins on the opposite side of the connector from the side used by other peripheral connectors, may be properly connected to and driven by the universal connector properly by rotation of 180 degrees.

Figure 5:
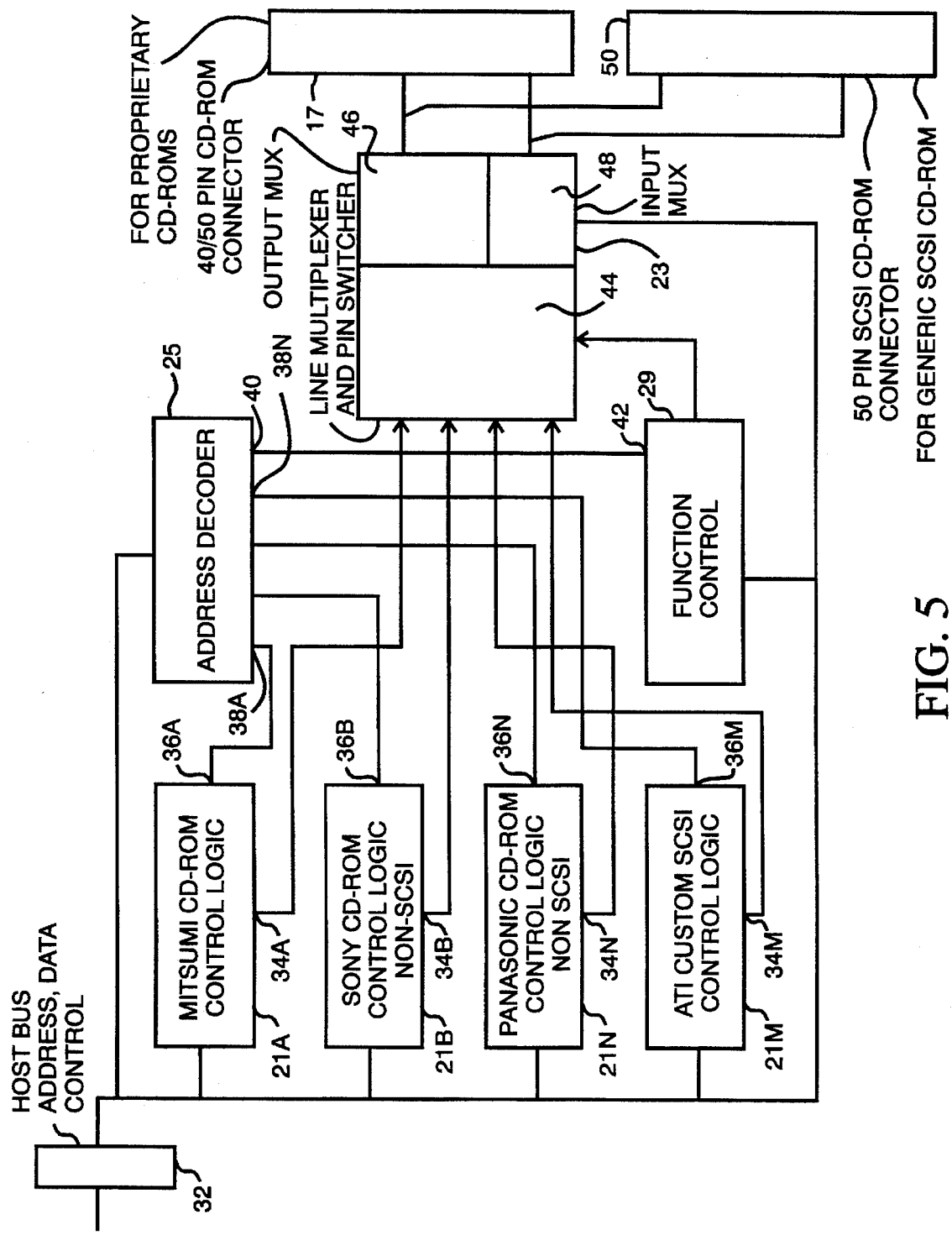

FIG. 5 illustrates the multiplexer and pin switcher 23 in more detail, and illustrates another embodiment of the connector arrangement.

Address decoder 25 is connected to and receives address signals from host bus 32, and decodes them to define which CD ROM control logic circuit 21A–21N (including SCSI control logic circuit 21M) is to be selected. The address signal is applied to the host bus upon selection of a particular CD ROM from a menu displayed on the host display under control of an application software installation program. Function control 29 receives an enable signal from the host bus, and applies a select signal via its output port 42 to a select input port 40 of decoder 25. When it receives the select signal, decoder 25 applies a select signal to a select input port of a CD ROM resulting from the decoding of the CD ROM address signal.

Function control 42 also applies control signals to multiplexer 23, for control of the multiplexer 23.

Multiplexer 23 contains a signal receiving portion 44, an output multiplexer portion 46, and an input portion 48. The output portion connects the leads of the particular CD ROM control logic to the appropriate leads leading to a pin of universal connector 17. The input portion receives data signals from the CD ROM via particular pins of the connector 17 and routes them to the host bus 32 for receipt by the host processor and/or the selected (enabled) CD ROM control logic circuit 21A–21N.

In accordance with an embodiment of the invention, a second connector, a standard SCSI connector 50 is connected in parallel with connector 17. As connector 17 will typically have 40 pins, and connector 50 has 50 pins, 40 of the 50 pins of connector 50 are connected directly in parallel with the pins of connector 17, and the remainder of the 50 pins are connected to other leads of multiplexer 23 or to ground. The preferred scheme will be described further below.

Indeed, rather than having two connectors each having a different number of pins, connector 17 can have the larger number of pins, e.g. 50, in order to allow an SCSI connector to be connected to it, a proprietary 40 pin connector to be connected to it, a 50 pin proprietary connector to be connected to it, or a proprietary connector using a different number of pins to be connected to it.

Figure 6:
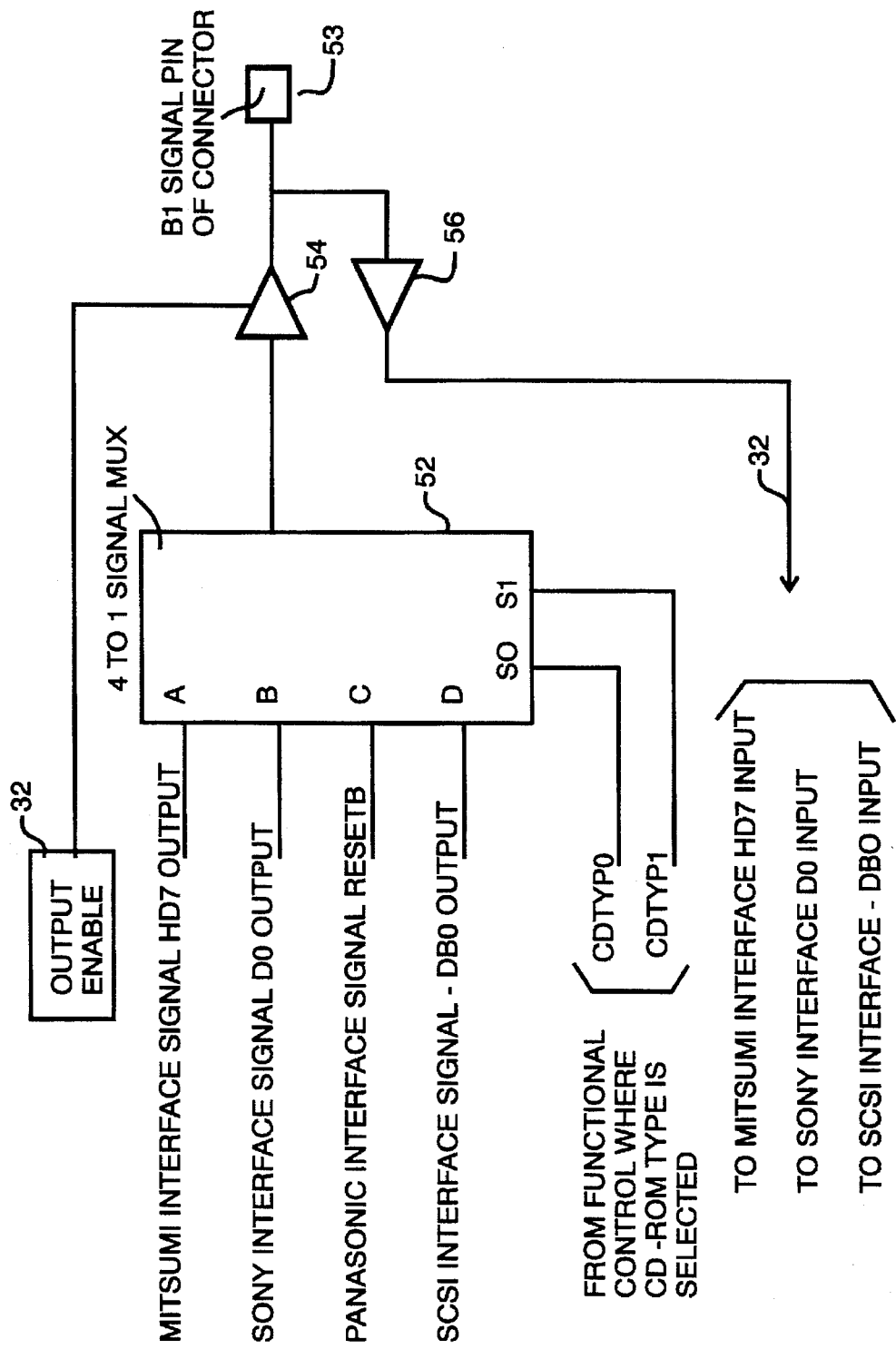

FIG. 6 illustrates in more detail the multiplexer interface with the universal connector. Plural leads from each of the CD ROM control logic circuits are connected to plural multiplexers, such as 52, together forming multiplexer 23. Multiplexer 52 thus will be a representative example of the remainder.

One of each of corresponding leads of the control logic circuits are connected to corresponding inputs A, B, C and D of a 4:1 signal multiplexer 52. It will be recognized that since each of the control logic circuits control a proprietary CD ROM drive, the signals carried on the corresponding leads will be different. Thus for example, from a Mitsumi CD ROM control circuit, the signal on one lead will be its HD7 output, the signal on the corresponding lead on a Sony CD ROM control circuit will be its DO output, the signal on the corresponding lead on a Panasonic CD ROM control circuit will be its RESETB output, and the signal on the corresponding lead on an SCSI control circuit will be a −DB0 output. However, each output is correct for its corresponding CD ROM drive.

Multiplexer 52 receives control signals at its S0 and S1 inputs from the function control 29, which signals are derived from the host bus 32. This signal enables signals appearing at the particular input A, B, C or D to be routed to its output.

The output of multiplexer 52 is applied to the input of a tri-state switch, which has its enable control input connected to host bus 32. Thus with a control selection signal received on leads CDTYP0 and CDTYP1 which carry control signals from the function control 29, a signal from one lead of the addressed (selected) control logic circuit appears at the input of tri-state switch 54. When tri-state switch 54 is enabled, the signal that appears at its input is applied to pin 53 of connector 17 (as well as connector 50, if used).

Signals appearing at pin 53, which can be either output from switch 54, or which can be input from a CD ROM via pin 53, are passed through buffer 56, and are applied to host bus 32 for reception by the host multiplexer, and by the selected control logic circuit if it requires it.

The following truth table lists representative logic signals input to control inputs S0 and S1, carried by corresponding leads CDTYP0 and CDTYP1 respectively:

SCSI CD ROM connector 58M is also illustrated. Each of representative mating CD ROM connectors are labelled with the name of its CD ROM. Thus for example while the Sony and Panasonic connectors are 40 pin connectors similarly numbered, the Mitsumi CD ROM has a 40 pin connector numbered oppositely. Universal connector 17 is shown in the embodiment in which it has 50 pins, numbered to match the SCSI connector, although any of the mating connectors 598A–58N can connect to it, flush against one end. The Misumi mating connector is flipped 180 degrees, in order to have its pins match the corresponding pins of connector 17.

Table A illustrates signal functions on various leads and corresponding pins of proprietary CD ROMs from various manufacturers and of an SCSI standard against the pinout and signals carried on those pins of a preferred embodiment of the universal CD ROM connector of the present invention. It has been found that the signals of the CD ROMS are usually carried on one side of its proprietary connector. The present invention switches only signals, and not grounds. The universal connector is wired such that the grounds are mainly on one side of the connector. When the Mitusmi mating connector is used, it is flipped 180 degrees relative to the others, in order to have its correct pins connected to the universal connector.

TABLE A

Universal CD-ROM connector and pin mappint to other CD-ROMs

| Pin No | Universal CD-ROM | Pin No | Universal CD-ROM | Mitsumi | SONY | Panasonic | SCSI |
|---|---|---|---|---|---|---|---|
| A1 | GND | B1 | UNB1 | HD7 | D0 | RESETB | −DB0 |
| A2 | GND | B2 | UNB2 | HD6 | D1 | GND | −DB1 |
| A3 | GND | B3 | UNB3 | HD5 | D2 | DRVSL0B | −DB2 |
| A4 | GND | B4 | UNB4 | HD4 | D3 | DRBSL1B | −DB3 |
| A5 | GND | B5 | UNB5 | HD3 | D4 | HWRB | −DB4 |
| A6 | GND | B6 | UNB6 | HD2 | D5 | HRDB | −DB5 |
| A7 | GND | B7 | UNB7 | HD1 | D6 | STCH | −DB6 |
| A8 | GND | B8 | UNB8 | HD0 | D7 | ADPCMB | −DB7 |
| A9 | GND | B9 | UNB9 | ENABL | ERR | DRQ | −DBP |
| A10 | GND | B10 | UNB10 | IOW | STENB | DTENB | GND |
| A11 | GND | B11 | UNB11 | IOR | DENB | ENABLEB | GND |
| A12 | GND | B12 | UNB12 | DACK | DRQWB | STENB | GND |
| A13 | GND | B13 | UNB13 | DRQ | DCMSB | CMDB | TERMP |
| A14 | GND | B14 | UNB14 | IRQ | READB | EOPB | GND |
| A15 | GND | B15 | UNB15 | NC | CMDWRB | GND | GND |
| A16 | UNA16* | B16 | UNB16 | NC | DRVSL0B | DB6 | −ATN |
| A17 | GND | B17 | UNB17 | NC | DRVSL1B | DB5 | GDN |
| A18 | UNA18* | B18 | UNB18 | NC | DRVSL2B | DB4 | −BSY |
| A19 | GND | B19 | UNB19 | HA1 | DRVSL3B | DB3 | −ACK |
| A20 | UNA20* | B20 | UNB20 | HA0 | RESETB | DB2 | −RST |
| A21 | GND | B21 | UNB21 | NC | NC | NC | −MSG |
| A22 | GND | B22 | UNB22 | NC | NC | NC | −SEL |
| A23 | GND | B23 | UNB23 | NC | NC | NC | −C/D |
| A24 | GND | B24 | UNB24 | NC | NC | NC | −REQ |
| A25 | GND | B25 | UNB25 | NC | NC | NC | −I/O |

*Note:
UNA16, UNA18 & UNA20 are mapped to Panasonic DB7, DB4 and DB1

| CDTYP0 | CDTYP1 | CD ROM TYPE |
|---|---|---|
| 0 | 0 | Mitsumi |
| 0 | 1 | Sony |
| 1 | 0 | Panasonic |
| 1 | 1 | SCSI |

Figure 7:
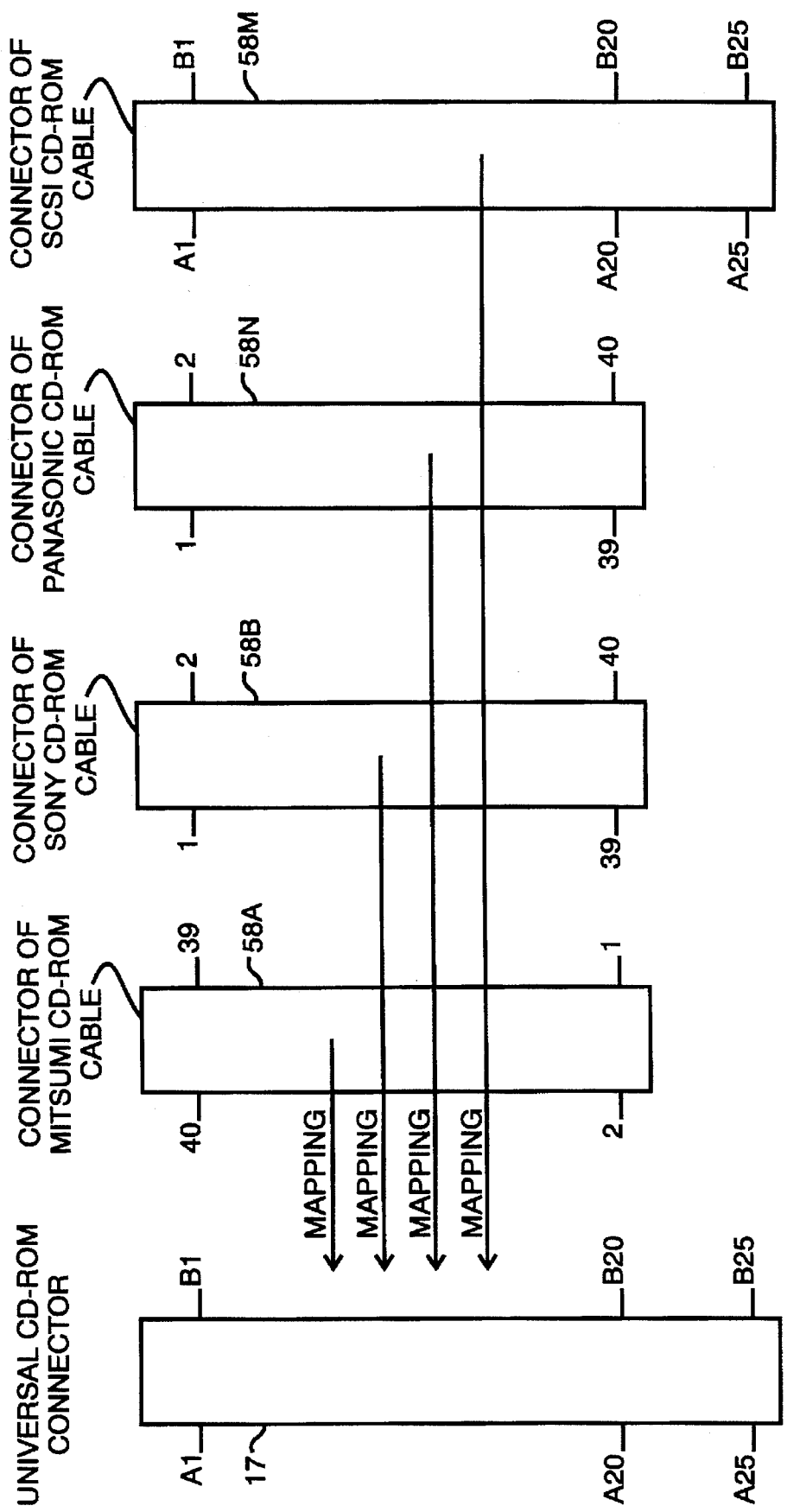

Mapping between universal connector 17 and different CD ROM mating connectors 58A–58N is shown in FIG. 7.

A person understanding this invention may now conceive of alternative structures and embodiments or variations of the above. All of those which fall within the scope of the claims appended hereto are considered to be part of the present invention.

We claim:
1. A universal peripheral interface comprising:
 a) a plurality of control logic circuits for controlling a plurality of compact disk read only memory (CD ROM) peripherals various ones of which have different pin assignments and thereby carrying different signals on different pins of respective peripheral connectors, b) a single interface connector having a pin arrangement capable of mating with any of the peripheral connectors, c) at least one of said peripheral connectors having one of various pin assignments, mating with said interface connector, d) a first multiplexer for interfacing any of said control logic circuits with the single interface connector and for switching particular lines of each of said control logic circuits carrying particular signals to particular pins of said single interface connector, and e) means for controlling the multiplexer to map said particular lines to said particular pins of said single connector.

2. An interface as defined in claim 1 further including an address decoder, and means for connecting the address decoder and the control logic circuits to a host bus for receiving address and data signals, the address decoder including means for selecting a particular addressed control logic circuit to receive data signals from the host bus and to provide signals resulting therefrom via said particular lines to the multiplexer.

3. An interface as defined in claim 2 further including an input multiplexer for receiving signals from particular input pins of the single interface connector and for providing the received signals on predetermined standard conductors of the host bus.

4. An interface as defined in claim 3 in which one of the control logic circuits is a small computer system interface (SCSI) CD ROM interface circuit, and further including a standard SCSI connector connected to an output of the first multiplexer and connected to an input of the input multiplexer.

5. An interface as defined in claim 4 in which at least some pins of the SCSI connector are connected in parallel with said interface connector.

6. An interface as defined in claim 4, in which said interface connector has 40 pins and the SCSI connector has 50 pins, wherein 40 pins of the SCSI connector are connected in parallel with the 40 pins of said interface connector.

7. An interface as defined in claim 3, in which said interface connector is comprised of two rows of pins, in which conductors of the first and input multiplexers are connected to only one row of pins of the interface connector.

8. An interface as defined in claim 7 in which at least some of the remaining pins of the interface connector are connected to ground.

9. An interface as defined in claim 7 in which the single interface connector is reversible whereby a peripheral connector can be connected to the interface connector in either of respective reversible 180 degree orientations.

* * * * *